United States Patent [19]
Spoor et al.

[11] 3,770,491
[45] Nov. 6, 1973

[54] SYSTEM HARDENABLE BY IONIZING RADIATION

[75] Inventors: Herbert Spoor, Limburgerhof; Kurt Demmler, Ludwigshafen, both of Germany

[73] Assignee: Badische Anilin- & Soda-Fabrik Aktiengesellschaft, Ludwigshafen/Rhine, Germany

[22] Filed: Nov. 8, 1971

[21] Appl. No.: 196,776

[52] U.S. Cl. .... 117/93.31, 117/161 K, 117/161 VC, 204/159.15, 204/159.22, 260/78.4 D, 260/78.5 BB, 260/80.81
[51] Int. Cl. .............................................. B44d 1/50
[58] Field of Search .................... 117/93.31, 161 K, 117/161 UC; 204/159.15, 159.22; 260/78.4 R, 78.4 D, 78.4 E, 78.5 BB, 78.5 T, 80.81, 861, 875

[56] References Cited
UNITED STATES PATENTS

| | | | |
|---|---|---|---|
| 3,425,977 | 2/1969 | Skoultchi et al. | 260/78.5 T |
| 3,448,089 | 6/1969 | Celeste | 260/78.5 T |
| 3,542,587 | 11/1970 | Aronoff et al. | 117/93.31 |
| 3,650,978 | 3/1972 | Chambers et al. | 260/78.5 T |

*Primary Examiner*—Alfred L. Leavitt
*Assistant Examiner*—John H. Newsome
*Attorney*—Johnston, Root, O'Keeffe, Keil, Thompson & Shurtleff

[57] ABSTRACT

A process for the production, on a substrate, of coatings with improved adhesion, mechanical properties and corrosion resistance wherein a mixture which contains, as the components forming the binder, a mixture of olefinically unsaturated organic compounds is first applied by a conventional method to the substrate to be coated and then cured with ionizing radiation and wherein the binder is a mixture of the following components:

A. from 50 to 98 percent by weight of at least one copolymerizable compound having a boiling point above 100°C and containing at least two olefinically unsaturated bonds:

B. from 50 to 2 percent by weight of compounds of the general formula:

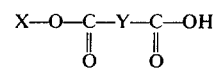

in which the radical X and/or Y contains at least one copolymerizable C—C double bond and up to twenty carbon atoms; and C. from 0 to 30 percent by weight of at least one other compound (not identical with the compounds specified under (B) having a single olefinic unsaturation; the sum of the percentages given under (A), (B) and (C) being 100.

18 Claims, No Drawings

SYSTEM HARDENABLE BY IONIZING RADIATION

The present invention relates to an ethylenically unsaturated system which can by polymerized under the influence of ionizing radiation, particularly electron radiation.

It is known from U.S. Pat. Nos. 3,133,828 and 3,247,012 and U.K. Patent Specification No. 949,191 that alkyd resins and unsaturated polyester resins can be cured under the action of ionizing radiation. Moreover polyester resins capable of being cured by means of high-energy radiation are proposed in German Published Application No. 1,959,524 which contain, as cure accelerators, cyclic anhydrides of acid imides of unsaturated dicarboxylic acids mixed with the polyester resins.

The processes claimed in the said patents and patent application and directed to specific polymerizable systems and additives are however still in need of improvement as regards a number of properties which are of importance in coating compositions.

It is an object of the present invention to provide polymerizable systems curable by the action of ionizing radiation which are distinguished by simple and safe handling during processing and which in curing with high-energy radiation give coatings which do not need any aftertreatment, adhere particularly well to the substrate, exhibit good mechanical properties and afford good protection against corrosion.

In accordance with this invention the said object is achieved by a process for the production of a coating on a substrate in which a mixture of substances which contains as the component forming the binder a mixture of olefinically unsaturated compounds is first applied by a conventional method to the substrate to be coated and is then cured with ionizing radiation, wherein the component forming the binder consists of a mixture of:

A. from 50 to 98 percent by weight of at least one at least twice olefinically unsaturated copolymerizable compound having a boiling point of more than 100°C;

B. from 50 to 2 percent by weight of at least one compound having the general formula:

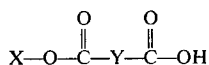

in which the radical X and/or Y contains at least one copolymerizable carbon-carbon double bond and up to 20 carbon atoms; and C. from 0 to 30 percent by weight of at least one other compound (not identical with the compounds specified under (B)) which has single olefinic unsaturation; the sum of the percentages specified under (A), (B) and (C) being 100.

The following may be said concerning the individual components of the mixture of olefinically unsaturated organic compounds forming the binder for the process claimed according to this invention:

A. Suitable at least twice olefinically unsaturated polymerizable compound having a boiling point above 100°C include appropriate hydrocarbons, in particular appropriate substitited aromatic hydrocarbons, as for example divinylbenzene. Esters of unsaturated alcohols with polybasic acids, particularly polybasic carboxylic acids, and ethers of unsaturated alcohols with polyhydric alcohols, particularly the esters and ethers of allyl alcohol or methallyl alcohol are also suitable. Polybasic carboxylic acids which are suitable as esterification components for the unsaturated alcohols include dibasic, tribasic and higher polybasic saturated or unsaturated aliphatic, saturated or unsaturated cycloaliphatic or aromatic carboxylic acids. Suitable esters of the said type are for example diallyl or dimethallyl esters of succinic, glutaric, adipic, maleic, fumaric, itaconic, hexahydrophthalic, tetrahydrphthalic, dihydrophthalic, o-phthalic, isophthalic and terephthalic acids as well as the triallyl or trimethallyl ester of trimellitic acid. Examples of suitable ethers of polyhydric alcohols with unsaturated alcohols are glycol diallyl ether, pentaerythritol tetraallyl ether, tetramethylolacetylenediurea polyallyl ethers and their soluble condensation products. Triallyl phosphate, triallyl cyanurate and trimethallyl cyanurate are also suitable.

Preferred components (A) are unsaturated polyesters including esters of unsaturated monocarboxylic acids with polyhydric, particularly dihydric, alcohols or oxaalkanols, as for example glycol diacrylate, glycol dimethacrylate, 1,3-propylene glycol diacrylate, 1,3-propylene glycol dimethacrylate, 1,4-butanediol diacrylate, 1,4-butanediol dimethacrylate, the acrylic and methacrylic diesters of 2-ethylhexanediol-1,6 or the corresponding diesters of crotonic acid and also the polycondensation products (conventionally used for the production of unsaturated polyester resins) of polybasic, particularly dibasic carboxylic acids which are united like esters with polyhydric, particularly dihydric, alcohols and which may if desired contain additional radicals of monohydric carboxylic acids and/or radicals of monohydric alcohols and/or radicals of hydroxycarboxylic acids, at least some of the radicals having ethylenically unsaturated copolymerizable groups. These unsaturated polyesters are usually prepared from their components by melt condensation or by condensation under azeotrope conditions.

It has been found to be generally advantageous for the unsaturated polyesters to have an acid number of less than 70, preferable less than 50, and a mean molecular weight of up to 4,000.

Conventional alkanediols, particularly those having acyclic or cyclic groups or both types of groups, such as ethylene glycol, propylene glycol-(1,2), butanediol-(1,3), butanediol-(1,4), hexanediol-(1,6), 2,2-dimethylpropanediol-(1,3), diethylene glycol, tri-ethylene glycol, cyclohexanediol-(1,2), 2,2-bis-(p-hydroxycyclohexyl)-propane, 1,4-bismethylolcyclohexane or butanediol-(1,4) are suitable as the polyhydric, particularly dihydric, saturated alcohols generally used as components for such unsaturated polyesters. Monohydric, trihydric and higher polydydric alcohols, as for example benzyl alcohol, 1,3-di(allyloxy)-propanol-(2), glycerol, pentaerythritol or trimethylolpropane, may also be used in minor amounts. The polyhydric, particularly dihydric alcohols are generally reacted in stoichiometric or substantially stoichiometric amounts with polybasic, particularly dibasic, carboxylic acids or their condensable derivatives.

Carboxylic acids or their derivatives which are suitable for the production of unsaturated polyesters are dibasic olefinically unsaturated carboxylic acids, as for example maleic acid, fumaric acid, itaconic acid, citraconic acid or mesaconic acid or their anhydrides. The polyesters may additionally contain condensed units of other dibasic unsaturated and/or saturated carboxylic acids, as for example succinic acid, glutaric acid, α-methylglutaric acid, adipic acid, sebacic acid o-phthalic acid, isophthalic acid, terephthalic acid, 1,2,3,6-tetrahydrophthalic acid, 3,6-endomethylene-1,2,3,6-tetrahydrophthalic acid or chlorine substitution products of the same such as 2,3,4,5,7,7-hexachloro-2,5-endomethylene-1,2,5,6-tetrahydrophthalic acid, and also monobasic, tribasic and higher polybasic carboxylic acids, as for example propionic acid, 1,2,4-benzenetricarboxylic acid or 1,2,4,5-benzenetetracarboxylic acid.

Unsaturated polyesters of this type may for example be built up from about 0.8 to 2.4 moles of maleic acid and from 0.8 to 2.4 moles of o-phthalic acid and about 1.6 to 4.8 moles of ethylene glycol and/or 1,2-propylene glycol or from about equimolar amounts of 2,3,4,5,7,7-hexachloro-2,5-endomethylene-1,2,5,6-tetrahydrophthalic acid and butanediol-(1,4).

Mixtures of the compounds specified above may also be suitable as component (A).

The compound (A) is contained in the mixture of olefinically unsaturated organic compounds forming the binder employed for the process according to the invention in an amount of from 50 to 98 percent, preferably from 60 to 80 percent, by weight based on the total amount of the mixture forming the binder.

B. Suitable compounds of the general formula:

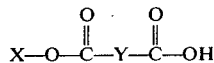

in which the radical X and/or Y contains at least one copolymerizable carbon-carbon double bond are partial esters of polycarboxylic acids, particularly monoesters of dicarboxylic acids, which contain a copolymerizable carbon-carbon double bond either in the polycarboxylic acid component or in the alcohol component or in both the polycarboxylic acid component and the alcohol component.

The following are suitable polycarboxylic acid components for component (B): linear or branched, if desired olefinically unsaturated aliphatic polycarboxylic acids of two to 20 carbon atoms, particularly dicarboxylic acids, as for example succinic acid, glutaric acid, α-methylglutaric acid, adipic acid, sebacic acid, maleic acid, fumaric acid, itaconic acid, citraconic acid, mesaconic acid, or malic acid, optionally olefinically unsaturated cycloaliphatic polycarboxylic acids of seven to 12 carbon atoms, which may bear alkyl as a substituent on the cycloalkyl radical, particularly dicarboxylic acids, as for example cyclopentane dicarboxylic acid, 1,2-cyclohexane dicarboxylic acid, 1,3-cyclohexane dicarboxylic acid, 1,4-cyclohexane dicarboxylic acid, partially hydrogenated benzenedicarboxylic acids such as tetrahydrophthalic acid or dihydrophthalic acid, alkyl-substituted partially hydrogenated benzenedicarboxylic acids or bicyclooctene tetracarboxylic acid or aromatic polycarboxylic acids which may be alkylsubstituted, in particular aromatic dicarboxylic acids or eight to 12 carbon atoms, as for example o-phthalic, isophthalic, tetraphthalic, naphthalene dicarboxylic, trimellitic, pyro-mellitic or benzene tetracarboxylic acid or alkyl-substituted benzene or napthalene polycarboxylic acids.

Suitable alcohol components for the component (B) in cases where the polycarboxylic acid component already contains a copolymerizable carbon-carbon double bond are linear or branched monoalcohols of one to 18 carbon atoms, as for example methanol, ethanol, propanol, isopropanol, n-butanol, isobutanol, tert-butanol, amyl alcohol, hexyl alcohol, n-octyl alcohol, 2-ethylhexyl alcohol, decanol, lauryl alcohol, tridecyl alcohol, stearyl alcohol; monoethers of alkanediols or oxaalkanediols, as for example glycol monomethyl ether, butyl diglycol; cycloaliphatic alcohols, as for example cyclohexanol; hemiesters of alkendiol or oxaalkanediols with saturated monocarboxylic acids, as for example glycol monoacetate, glycol monopropionate and diglycol monoacetate.

In cases where the polycarboxylic acid component does not contain a copolymerizable carbon-carbon double bond, this must be contained in the alcohol component. Examples of such alcohol components are dicyclopentenyl alcohol, allyl alcohol and methallyl alcohol.

Unsaturated alcohol components which are united at the free hydroxyl group provided for esterification with the polycarboxylic acid component with the radical:

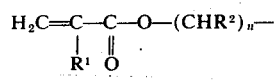

or

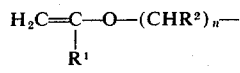

or

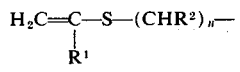

in which $R^1$ and $R^2$ may be identical or different and each denotes a hydrogen atom or an alkyl group of one to four carbon atoms and $n$ denotes one of the integers 2 to 6 are particularly suitable. Monoesters of oxaalkanediols of two to 20, preferably two to eight, carbon atoms with α,β-unsaturated monocarboxylic acids of three to six carbon atoms are also particularly suitable as unsaturated alcohol components. Examples of such compounds preferred as alcohol components are ethylene glycol monoacrylate, ethylene glycol monomethacrylate, 1,2-propylene glycol monoacrylate, 1,2-propylene glycol monomethacrylate, 1,3-propylene glycol monoacrylate, 1,3-propylene glycol monomethacrylate, 1,4-butanediol monoacrylate, 1,4-butanediol monomethacrylate, 1,6-hexanediol monoacrylate, 1,6-hexanediol monomethacrylate, 2-ethylhexanediol-1,6-monoacrylate, 2-ethylhexanediol-1,6-monomethacrylate, diglycol monoacrylate, diglycol monomethacrylate, triglycol monoacrylate and triglycol monomethacrylate; monovinyl ethers or monovinyl thioethers of alkanediols, as for example ethylene glycol monovinyl ether, 1,4-butanediol monovinyl ether, glycol monovinyl thioether, diglycol monovinyl ether or diglycol monovinyl thioether.

Compounds from the abovementioned classes which are suitable as component (B) also include for example monoethyl tetrahydrophthalate, monoethyl dihydrophthalate, dicyclopentenyl succinate, dicyclopentenyl maleate and dicyclopentenyl fumarate.

Maleic acid monoesters of 1,4-butanediol monoacrylate and monomethacrylate, o-phthalic esters of glycol acrylate and methacrylate, bicyclooctene tetracarboxylic monoesters of ethylene glycol monoacrylate and monomethacrylate, tetrahydrophthalic monoesters of butanediol-1,4 monoacrylate and monomethacrylate and of ethylene glycol monoacrylate and monomethacrylate, dihydrophthalic monoesters of ethylene glycol and 1,4-butanediol monoacrylate and monomethacrylate, the monoesters of 0-phthalic acid, dihydrophthalic acid and tetrahydrophthalic acid with vinyl thioethanol and mixtures of these compounds are particularly preferred as components (B).

The component (B) is contained in the mixture of olefinically unsaturated organic compounds forming the binder used for the process according to the invention in an amount of from 2 to 50 percent, preferably from 20 to 40 percent, by weight based on the total amount of the mixture forming the binder.

The optionally used component (C) may be a singly olefinically unsaturated compound which is not identical with the compound specified under (B). Conventional monoolefinically unsaturated organic compounds are suitable, for example monoolefinically unsaturated hydrocarbons such as vinylaromatics, for example styrene, styrenes bearing halogen and/or alkyl as substituents; monoolefinically unsaturated ethers, as for example vinyl ethers; monoolefinically unsaturated esters such as vinyl esters and/or esters of $\alpha,\beta$-unsaturated monocarboxylic acids, as for example vinyl acetate, vinyl propionate, vinyl butyrate, vinyl versatic esters, acrylic or methacrylic esters of methanol, ethanol, propanol, isopropanol, n-butanol, isobutanol, tert.-butanol, hexanol, cyclohexanol, 2-ethylhexanol, nitriles of $\alpha,\beta$-olefinically unsaturated monocarboxylic acids, as for example acrylonitrile, methacrylonitrile; and other copolymerizable monoolefinically unsaturated compounds such as N-vinylpyrrolidone, N-vinylacetamide, N-vinyllactam or N-vinylcarbazole. Mixtures of the monoolefinically unsaturated compounds specified under (C) are also suitable.

Component (C) may be contained in the mixture of olefinically unsaturated compounds forming the binder used for the process according to the invention in an amount of up to 30 percent, preferably up to 20 percent, by weight based on the total amount of the mixture forming the binder.

The individual components (A), (B), and (C) and any other substances may be mixed in conventional mixing equipment.

The process of the invention is suitable for coating metallic surfaces, as for example iron, steel or aluminum articles, and also articles of glass, ceramics, porcelain, wood, paper and plastics, and for both porous and smooth surfaces.

The conventional methods of application, as for example spraying, dipping, flooding, doctoring or pouring, may be used for applying the mixture forming the binder.

It has proved to be advantageous to apply the coating composition in a layer having a thickness of up to 500 microns, particular of from 20 to 200 microns.

The mixture forming the binder may also have added to it fillers, pigments and/or inorganic or organic dyes and other auxiliaries, as for example small amounts or organic solvents, stabilizers for increasing stability in storage, plasticizers and flow promoters such as are described for example in the abovementioned patents and published applications and also in U.K. Patent No. 1,159,552, German Printed Application No. 1,904,058 and German Published Application 1,932,687. Polymers and polycondensates, particularly those containing $NO_2$ groups may also be added in minor amounts.

The ionizing radiation used for curing the coatings may be $\alpha$-radiation, X-rays, $\gamma$-radiation, mixed radiation released in nuclear reactors or preferably electron beams.

Examples of suitable radiation sources are cobalt-$\alpha$, nuclear reactors and, for electron radiation, Van de Graaf generators and other commercial generators of electron radiation. Conventional equipment for the production of ionizing and electron radiation is described for example in A. Charlesby, "Atomic Radiation and Polymers," 1960, Pergamon Press, Oxford. The radiation energy used depends on the thickness of the layer of the coating to be cured. Electron radiation which has been produced with an acceleration potential of 100 to 500, particularly 100 to 300, KeV has proved to be particularly advantageous for the process of the invention.

The radiation dose necessary for curing depends on the composition of the mixture of olefinically unsaturated organic compounds to be cured but is generally within a range from 1 to 50, preferably less than 20, mrad. Irradiation is advantageously carried out while excluding air, for example in an inert gas such as nitrogen or producer gas.

The length of irradiation depends on the intensity of radiation, the distance of the radiation source from the coating to be cured and the thickness of the coating.

Apparatus in which the substrate coated with the coating to be cured is passed through on a conveyer belt beneath the radiation source is advantageously used for carrying out the process according to the invention.

The process of the invention is simple and safe, it has very short curing times and the coating obtained have very valuable properties. Coatings prepared by the invention show vary good adherence to the substrate, particularly to metal, good mechanical properties, particularly flexibility, and afford good protection from corrosion and resistance to chemical reagents.

The following Examples illustrate the invention. The parts are parts by weight.

EXAMPLE 1

Films of 70 parts of a polyester of equimolar amounts of fumaric acid and diethylene glycol and 30 parts of the maleic monoester of 1,4-butanediol monoacrylate which have been obtained by adding equimolar amounts of maleic anhydride and butanediol monoacrylate are applied wet in a thickness of 100 microns (the width of the gap of the film applying equipment), covered with a sheet of polyethylene terephthalate having a thickness of 25 millimicrons and irradiated with a dose of 7.2 mrad using a Van de Graaf generator (2 MeV). The fingernail scratch resistant film has good adherence to metal. This is far better than in the case of film of 70 parts of the same polyester and 30 parts of styrene which has been cured under the same conditions.

EXAMPLE 2

Film of 30 parts of the polyester specified in Example 1, 50 parts of the o-phthalic monoester of glycol monomethacrylate and 20 parts of styrene applied wet in a thickness of 100 microns is cured as described in Example 1 and gives scratch-resistant films having good adherence to metal.

EXAMPLE 3

Film applied wet in a thickness of 100 microns from 50 parts of a polyester from 1 mole of maleic acid, 2 moles of o-phthalic acid and equivalent amounts of propylene glycol-1,2 and 50 parts of tetrahydrophthalic acid monoester of vinylthioethanol is irradiated under an atmosphere of nitrogen with a 300 KeV electron generator with a dose of 8 mrad. Scratch-resistant films having good adherence to metal are obtained.

EXAMPLE 4

Film applied wet in a thickness of 100 microns from 50 parts of the polyester specified in Example 1, 25 parts of the adduct of 1 mole of bicyclooctenetetracarboxylic dianhydride and 2 moles of ethylene glycol monomethacrylate and 25 parts of styrene is irradiated under a nitrogen atmosphere with a 300 KeV electron generator with a dose of 8 mrad.

The scratch-resistant films obtained have a good adhesion to metal.

EXAMPLE 5

A film applied wet in a thickness of 100 microns from a mixture of 50 parts of the unsaturated polyester specified in Example 1 20 parts of styrene and 30 parts of the o-phthalic acid ester of vinylthioethanol is covered with a sheet of polyethylene terephthalate having a thickness of 25 microns and irradiated with a Van de Graaf generator (2 MeV) with a dose of 7.2 mrad. The scratch-resistant film has excellent adherence to roughened metal. It does not crack off when sheet metal is bent through 180°.

EXAMPLE 6

A film applied wet in a thickness of 50 microns from a mixture of 60 parts of an unsaturated polyester which has been prepared from equimolar amounts of fumaric acid and diethylene glycol, 20 parts of styrene and 30 parts of tetrahydrophthalic monoester of butanediol-1,4 monoacrylate onto sheet iron is irradiated under nitrogen with electrons having an energy of 300 KeV in a dose of 7 mrad. A hard nontacky film is obtained having good adherence, elasticity and resistance to chemical reagents.

EXAMPLE 7

Polyester (A): the polyester of Example 1;

Polyester (B): 1470 parts of maleic anhydride, 1,110 parts of phthalic anhydride and 1,815 parts of propylene glycol-1,2 are esterified up to an acid number of about 50 while stirring and passing nitrogen over at 190° to 200°C.

Polyester (C): 1 mole of maleic anhydride, 1 mole of hexachloroendomethylene tetrahydrophthalic anhydride, 0.5 mole of ethylene glycol, 0.5 mole of diethylene glycol and 1.3 moles of propylene glycol are esterified up to an acid number of about 30 while stirring an passing nitrogen over.

These polyesters, with the maleic acid monoester of 1,4-butanediol monoacrylate (MBA) and triethylene glycol diacrylate (TGDA) with an addition of 0.01 percent of hydroquinone are dissolved in the amounts indicated in the Table. Films applied wet in a thickness of 200 microns (gap width of the film applying equipment) are irradiated under inert gas (producer gas) with 300 KV electrons, a radiation current strength of 50 mA, a conveyer belt speed of 15 m/min and a distance from the mergence window to the film surface of about 6 cm. The results are given in the Table.

TABLE

| Polyester | MBA | TGDA | Appearance of cured film |
|---|---|---|---|
| 60% (A) | 20% | 20% | good flow, scratch-resistant, bending test positive |
| 60% (B) | 20% | 20% | elastic film scratch-resistant, good adherence |
| 40% (C) | 20% | 40% | scratch-resistant, good adherence |
| 60% (B) | — | 40% | scratch-resistant, cracked off |

It should be noted that films obtained according to the invention have good adherence to sheet metal whereas the film without MBA given for comparison cracks off after the cure.

EXAMPLE 8

A mixture of 20 parts of ethylene glycol dimethacrylate, 30 parts of 1,4-butanediol diacrylate, 5 parts of divinylbenzene, 40 parts of the monoester of succinic acid with diethylene glycol monomethacrylate and 5 parts of butyl methacrylate is applied in a film thickness of 120 microns to sheet iron and cured under an atmosphere of nitrogen gas with an electron radiation of an acceleration potential of 300 KeV with a dose of 8 mrad. The coating obtained has good mechanical properties and good adhesion to the substrate.

We claim:

1. A process for producing a coating on a substrate wherein a mixture of substances which contains a mixture of olfeinically unsaturated organic compounds as components forming a binder is first applied by a suitable method to the substrate to be coated and then cured with ionizing radiation, wherein the components forming the binder consist of a mixture of:

A. from 50 to 98 percent by weight of at least one at least twice olefinically unsaturated copolymerizable compound with a boiling point of more than 100°C;

B. from 50 to 2 percent by weight of at least one compound of the general formula:

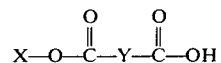

in which the radical X and/or Y contains at least one copolymerizable C-C double bond and up to 20 carbon atoms; and C. from 0 to 30 percent by weight of at least one other monoolefinically unsaturated compound which is not identical with the compounds specified under (B); the sum of the percentages given under (A), (B) and (C) being equal to 100.

2. A process as claimed in claim 1 wherein the radical X in the compound (B) is a

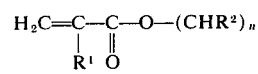

radical in which R¹ and R² may be identical or different and each denotes hydrogen or alkyl of one to four carbon atoms and $n$ denotes an integer from 2 to 6.

3. A process as claimed in claim 1 wherein the radical Y in the compound (B) denotes a linear or branched alkylene radical of two to 20 carbon atoms or a cycloalkylene radical or five to 10 carbon atoms or an arylene radical.

4. A process as claimed in claim 1 wherein the component forming the binder consists of a mixture of:
   from 60 to 80 percent by weight of component (A);
   from 20 to 40 percent by weight of component (B); and
   from 0 to 20 percent by weight of component (C),
   the sum of the percentages given under (A), (B) and (C) being 100.

5. A process as claimed in claim 1 wherein component (A) is at least one compound from the group consisting of glycol diacrylate, glycol dimethacrylate, 1,3-propylene glycol diacrylate, 1,3-propylene glycol dimethacrylate, 1,4-butanediol diacrylate, 1,4-butanediol dimethacrylate, 2-ethylhexanediol-1,6 diacrylate and 2-ethylhexanediol-1,6 dimethacrylate.

6. A process as claimed in claim 1 wherein an unsaturated polyester which is a polycondensation product from a polybasic carboxylic acid and a polyhydrid alcohol and which contains ethylenically unsaturated copolymerizable groups is used as component (A).

7. A process as claimed in claim 6 wherein the unsaturated polyester used as component (A) contains condensed therein in ester combination as the polybasic carboxylic acid at least one compound from the group consisting of maleic acid, fumaric acid and itaconic acid and, as polyhydric alcohol, at least one compound from the group consisting of ethylene glycol, propylene glycol-1,2, butanediol-1,3 butanediol-1,4, hexanediol-1,6, 2,2-dimethylpropanediol-1,3, diethylene glycol, triethylene glycol, cyclohexanediol-1,2, 2,2-bis-(p-hydroxycyclohexyl)-propane, 1,4-bismethylolcyclohexene and butenediol-1,4.

8. A process as claimed in claim 7 wherein the polycarboxylic acid, condensed into the unsaturated polyester, from the group consisting of maleic acid, fumaric acid and itaconic acid is partially replaced by at least one compound from the group consisting of succinic acid, glutaric acid, α-methylglutaric acid, adipic acid, sebacic acid, o-phthalic acid, isophthalic acid, terephthalic acid, tetrahydrophthalic acid, 3,6-endomethylene-1,2,3,6-tetrahydrophthalic acid and hexachloroendomethylenetetrahydrophthalic acid, and the unsaturated polyester has an acid number of less than 70.

9. A process as claimed in claim 1 wherein the radical X in the compound (B) is a

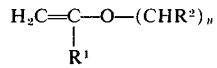

radical in which R¹ and R² may be identical or different and each denotes hydrogen or alkyl of one to four carbon atoms and $n$ denotes one of the integers from 2 to 6.

10. A process as claimed in claim wherein the radical X in the compound (B) is a

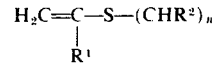

radical in which R¹ and R² may be identical or different and each denotes hydrogen or alkyl or one to four carbon atoms and $n$ denotes one of the integers from 2 to 6.

11. A process as claimed in claim 3 wherein the alkylene, cycloalkylene or arylene radical Y in compound (B) is olefinically unsaturated.

12. A process as claimed in claim 3 wherein the cycloalkylene or arylene radical specified as radical Y in compound (B) bears alkyl or carboxyl as a substituent.

13. A process as claimed in claim 1 wherein as component (B) there is used a monoester of a dicarboxylic acid from the group maleic acid, fumaric acid, o-phthalic acid, dihydrophthalic acid, tetrahydrophthalic acid, bicyclooctenetetracarboxylic acids, itaconic acid, succinic acid, glutaric acid, adipic acid, with a compound containing a hydroxyl group from the group consisting of ethylene glycol monoacrylate, ethylene glycol monomethacrylate, 1,2-propylene glycol monoacrylate or monomethacrylate, 1,3-propylene glycol monoacrylate or monomethacrylate, 1,4-butanediol monoacrylate, 1,4-butanediol monomethacrylate, 1,6-hexanediol monoacrylate or methacrylate, 2-ethylhexanediol-1,6 monoacrylate or monomethacrylate, diglycol monoacrylate or monomethacrylate, triglycol monoacrylate or monomethacrylate, ethylene glycol monovinyl ether, 1,4-butanediol monovinyl ether, glycol monovinyl thioether, diglycol monovinyl ether and diglycol monovinyl thioether.

14. A process as claimed in claim 1 wherein component (C) is styrene.

15. A process as claimed in claim 1 wherein the components forming the binder are applied to a substrate to be coated together with a known finely particled pigment or filler and cured with ionizing radiation.

16. A process as claimed in claim 1 wherein the components forming the binder are applied to a substrate to be coated mixed with a small amount of known additives from the group of organic solvents, stabilizers, plasticizers and flow improvers and cured with ionizing radiation.

17. A process as claimed in claim 1 wherein curing by irradiation with ionizing radiation is carried out while excluding air.

18. Articles whose surface has been coated by the process claimed in claim 1.

* * * * *

UNITED STATES PATENT OFFICE
CERTIFICATE OF CORRECTION

Patent No. 3,770,491  Dated November 6, 1973

Inventor(s) Herbert Spoor and Kurt Dimmler

It is certified that error appears in the above-identified patent and that said Letters Patent are hereby corrected as shown below:

First page, left-hand column, eleventh line, insert
-- [30]     Foreign Application Priority Data
    November 6, 1970    Germany . . . . P20 54 662.7 --.

First page, right-hand column, line 16, " compounds" should read -- a compound --.

Column 1, line 4, "by" should read -- be --.

Column 1, line 63, "substitited" should read -- substituted --.

Column 2, line 53, "polydydric" should read -- polyhydric --.

Column 3, line 2, insert -- , -- after "sebacic acid".

Column 3, line 59, "or" should read -- of --.

Column 6, line 8, "cobalt-" should read -- cobalt-60 --.

Column 9, line 36, insert -- , -- after "butanediol-1,3".

Column 10, line 5, insert -- 1 -- after "claim".

Signed and sealed this 8th day of October 1974.

(SEAL)
Attest:

McCOY M. GIBSON JR.  
Attesting Officer

C. MARSHALL DANN  
Commissioner of Patents